Aug. 18, 1970  H. A. McDONALD ET AL  3,524,548
FILTER MEDIUM FOR MOLTEN METAL
Filed Sept. 16, 1968  5 Sheets-Sheet 1
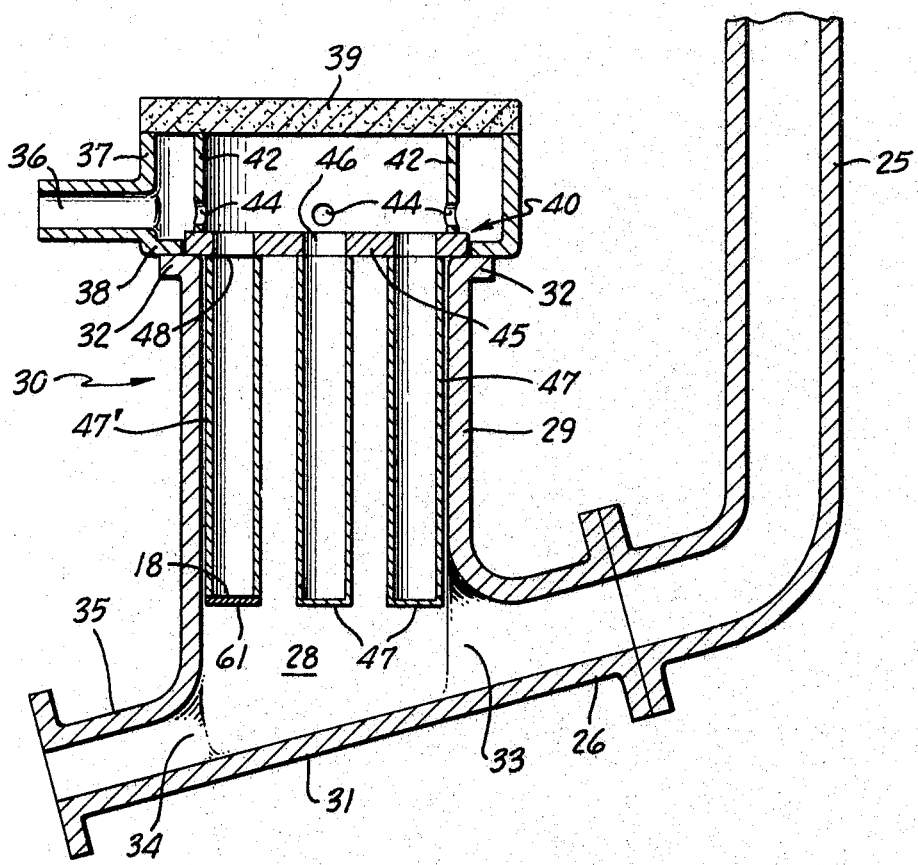
FIG_1
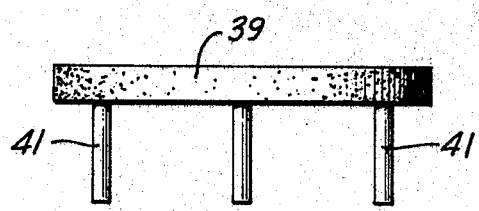
FIG_1A
HOWARD A. McDONALD &
ROBERT C. SNYDER
INVENTORS
BY
Katherine Lloyd
AGENT

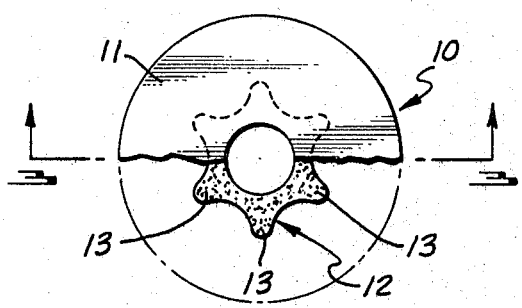
FIG_2
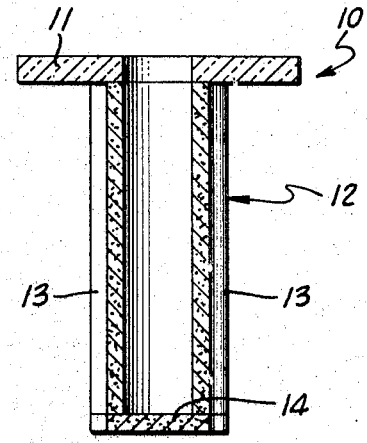
FIG_3
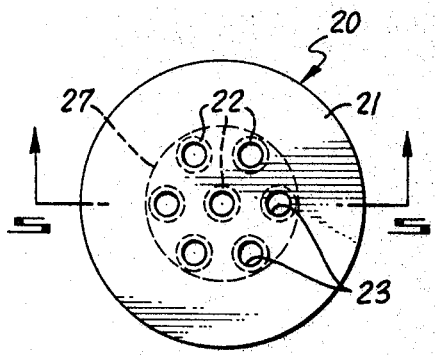
FIG_4
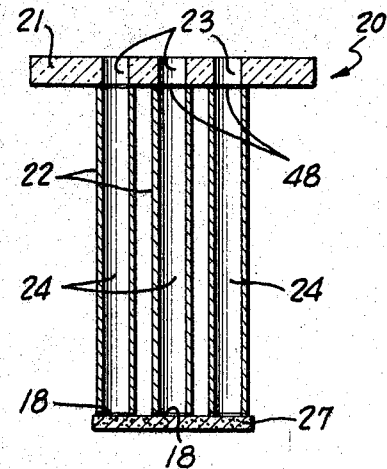
FIG_5
HOWARD A. McDONALD &
ROBERT C. SNYDER
INVENTORS
BY Katherine Lloyd
AGENT

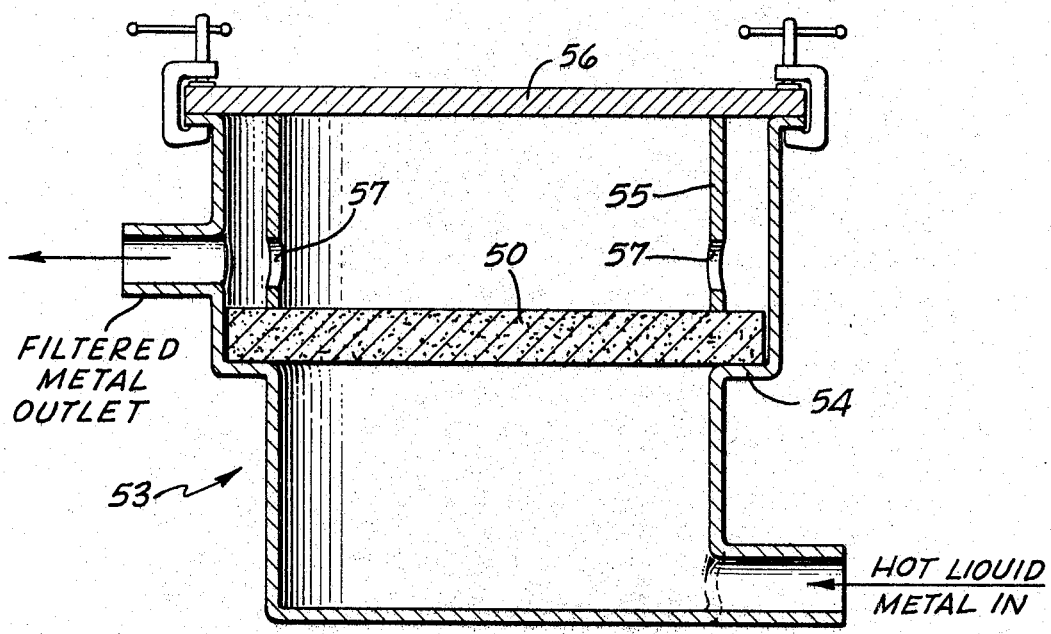
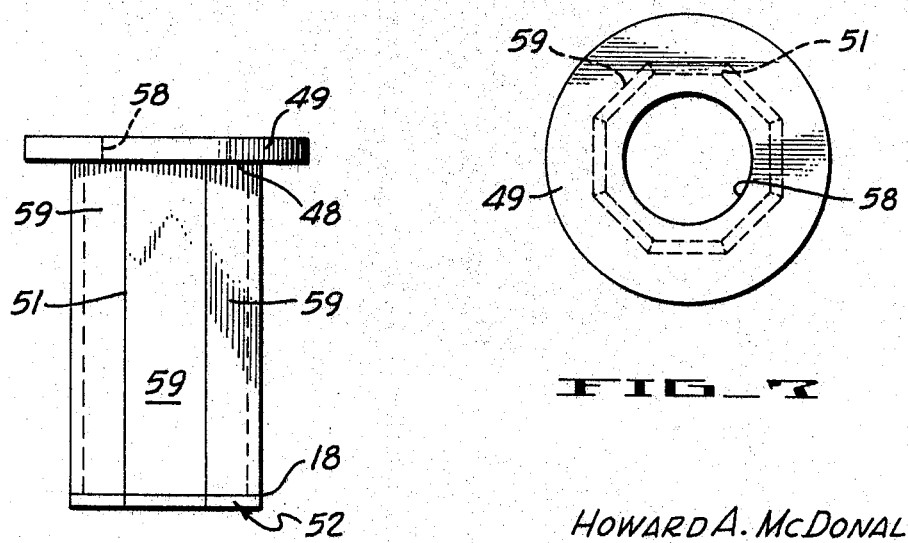
Howard A. McDonald &
Robert C. Snyder
INVENTORS

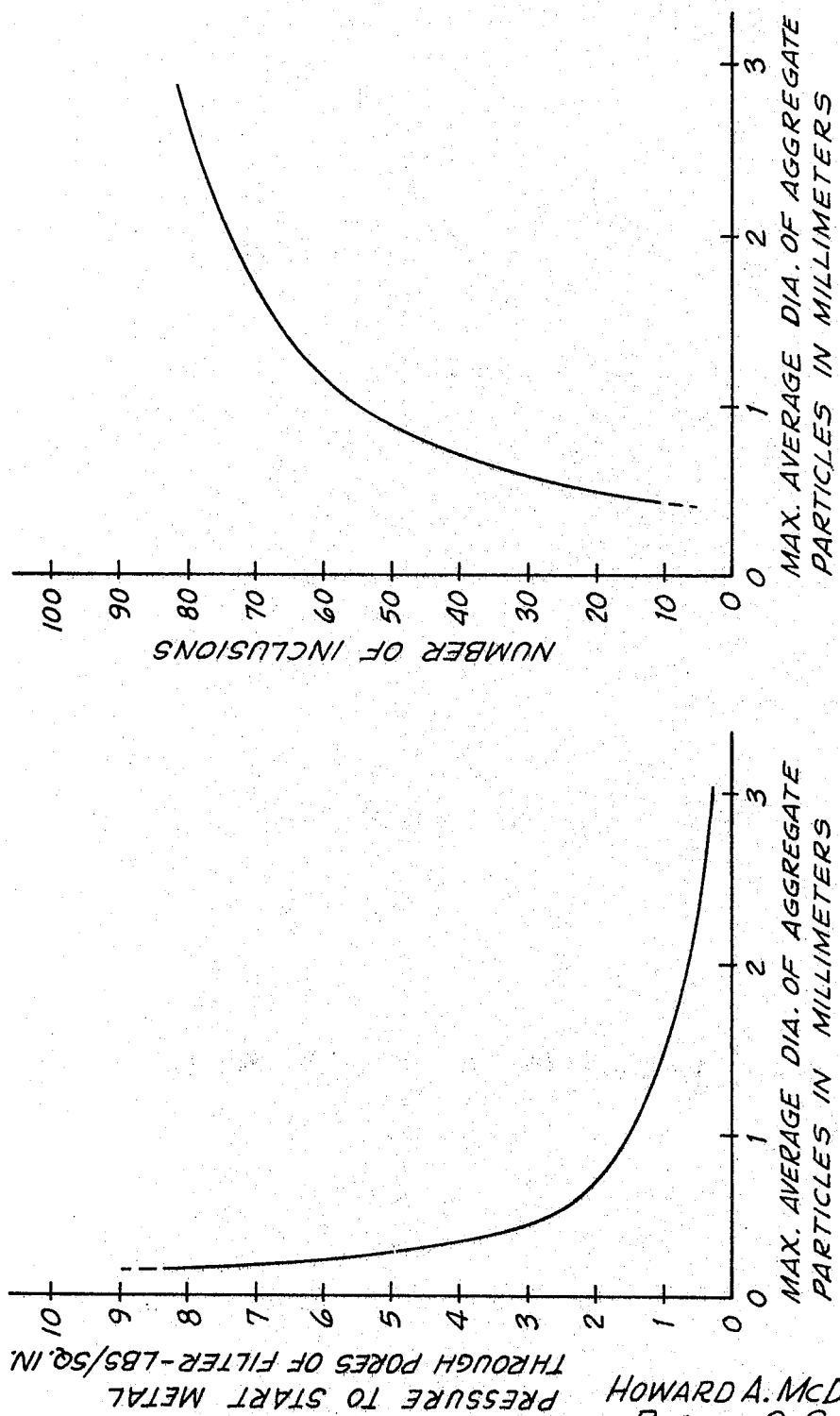

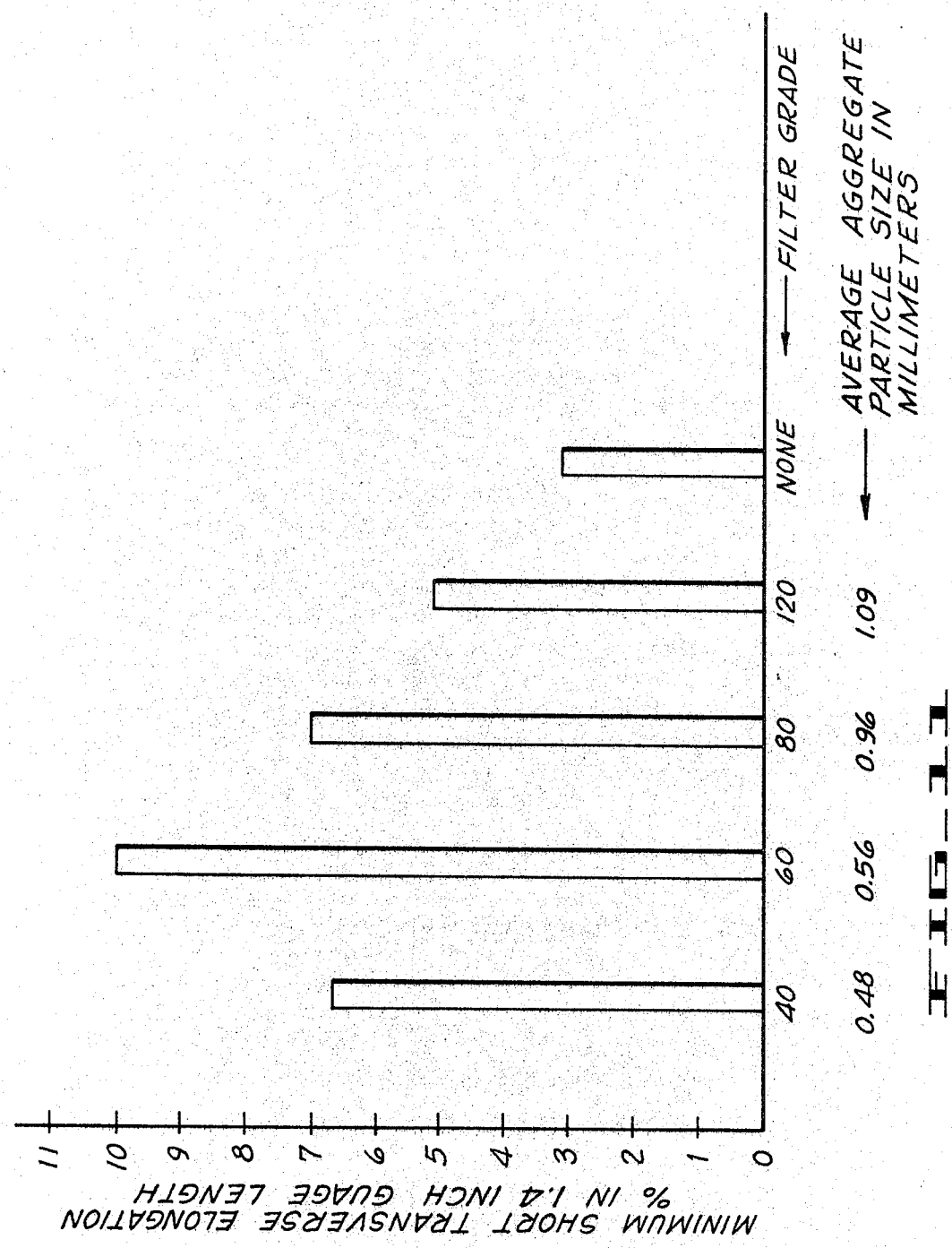

United States Patent Office 3,524,548
Patented Aug. 18, 1970

3,524,548
FILTER MEDIUM FOR MOLTEN METAL
Howard A. McDonald, Spokane, Wash., and Robert C. Snyder, Severna Park, Md., assignors to Kaiser Aluminum & Chemical Corporation, Oakland, Calif., a corporation of Delaware
Filed Sept. 16, 1968, Ser. No. 762,224
Int. Cl. B01d 39/20
U.S. Cl. 210—153
19 Claims

ABSTRACT OF THE DISCLOSURE

A rigid porous, filter medium for molten aluminum comprising particles of refractory material resistant to molten aluminum and a bonding agent which is a molten-aluminum-resistant vitreous material. To produce sound cast metal bodies, the refractory particles employed to make the filter have an average particle size of from about 0.165 mm. to 2.8 mm., advantageously of from 0.25 mm. to 2.5 mm., maximum diameter and the total fired composition contains from 4% to 20% by weight of the vitreous material.

BACKGROUND

Molten aluminum in practice generally contains entrained solids which are deleterious to the final cast metal product. These entrained solids usually derive from three sources. Some are particles of aluminum oxide which are drawn into the liquid stream from the floating oxide layer on its surface, and some entrained particles are fragments of furnace lining, transfer trough and other portions of the molten aluminum handling equipment which are eroded and entrained in the flowing aluminum stream, and some particles are precipitates of insoluble impurities such as intermetallics, borides, carbides or precipitates of other aluminum compounds, such as chlorides. When these inclusions appear in the final cast product after the molten aluminum is solidified, they cause such final product to be less ductile, of lower strength, or to have poor finishing characteristics. Accordingly, it is desirable to remove entrained solids from the molten aluminum stream before it is cast into a solid body which may be used as such or subjected to forming operations such as rolling, forging, extrusion, etc.

Filtering processes to remove entrained solids from liquids are accomplished by passing the solid-laden liquid through a porous filter medium that will not pass the solids. Filtering molten metal in general, and molten aluminum in particular, creates special problems because the liquid is so aggressive that it is difficult to find a filter medium capable of withstanding it. To avoid problems of deteriorating filter media, molten aluminum can be filtered through a bed of alumina particles.

In general, two methods of filtering are used for removing entrained solids from molten aluminum alloys before casting. The most common filter medium is an open weave glass cloth screen placed in the metal transfer trough, around the spout or even in the molten metal pool in the top of the solidifying ingot. These cloth screens are able to remove only the larger sizes of inclusions from the metal and are easily ruptured during use because the glass fibers become very weak at the temperature of molten aluminum. In another prior art procedure, molten aluminum is filtered through a bed of loose alumina particles, for example, of tabular alumina, but it often suffers from the drawbacks normally associated with bed filters in that it passes too many solids, there is a strong tendency to channeling which prevents efficient use, and pore size of the filter is not easily controlled but rather readily changes under conditions of use so that, even when originally of proper dimension, it cannot be efficiently maintained.

THE INVENTION

This invention relates to a rigid filter which is a fired, shaped article consisting essentially of a granular or particulate refractory material, which is compatible with molten aluminum, and is herein referred to also as aggregrate, bonded with a vitreous or glassy material uniformly dispersed therethrough. The granular material is refractory composition or batch in an average particle size from 0.165 mm. to 2.8 mm. advantageous of from 0.25 mm. to 2.5 mm. maximum diameter. The vitreous or glassy material is present in an amount of from 4% to 20%, based on total weight of the fired composition.

The granular material is any substance capable of resisting molten aluminum and which will maintain its solid form and dimensional stability at the temperatures of molten aluminum. An especially advantageous granular aggregate for use in the filters of this invention is alumina, especially fused alumina, or tabular alumina, which can be high purity commercial grade or made from naturally occurring alumina such as bauxite or diaspore; or there can be used fused mullite, boron nitride, titanium diboride or other suitable refractory material known to resist attack by molten aluminum. Mixtures of such substances with each other can be used. The grains are selected to have an average sizing as described herein and of such size distribution as to provide suitable porosity in the final fired article, as will be understood by those skilled in this art. That is to say, more uniform sizing of individual particles results in greater porosity in a shape formed therefrom. In the present invention, variations with respect to the average size of individual particles of a given batch can suitably amount to from about 50% to about 180% of such average size as defined herein.

The bonding material for the fired shape is a homogeneous, vitreous material which is low in silica and which is described in U.S. Pat. 2,997,402 issued Aug. 22, 1961, in the names of Howard A. McDonald and James E. Dore. This bonding component is a preformed glass, i.e., a prefused mixture of the oxides of boron, calcium and aluminum. As stated in U.S. Pat. 2,997,402, the glass may contain up to 15% of one or more of the oxides of magneium, barium, beryllium, zirconium, zinc, vanadium, chromium, or molybdenum. The glass contains not more than 10% silica, for satisfactory resistance to attack by molten aluminum.

In producing a filter element according to this invention, a mix is prepared of particles of suitable refractory grains as described herein and of average particle size of the ranges defined herein; and this is admixed with from 4% to 20%, or for optimum results from 5% to 14%, of a vitreous bonding agent as described above and suitably in finely divided state to make a uniform interdispersion thereof. There is also incorporated in the admixture a small amount, effective to form a cold or chemical bond in the mass, suitably from about 4% to 10%, by weight of the total batch, of an ephemeral or organic cold-bonding agent, that is, such agent as will burn or combust upon firing of the final shape to yield gaseous products of combustion which go off from the filter mass and do not leave any substantial amount of ash or solid residue therein. Such an agent is stearic acid, dextrin, aqueous wax emulsion, or the like. In preparing the batch, the refractory aggregate, the glassy agent and the ephemeral or organic cold bonding agent are suitably all mixed together simultaneously to form a uniform admixture. However, other methods of mixing can be carried out, as desired.

BRIEF DESCRIPTION OF THE DRAWINGS

The accompanying drawings are provided to illustrate the present invention and the advantages that can be obtained therefrom.

FIG. 1 is schematic, cross-sectional elevation view of one filter assembly according to the present invention, as installed in a metal-purifying zone or casting assembly.

FIG. 1a is an elevational view of one embodiment of a top closure means for a filter assembly herein.

FIGS. 2 and 3 are respectively a partial sectional plan view of one form of a filter made in accordance with this invention and a sectional elevational view of that filter, all illustrating the shape of another embodiment of the permeable filter material, FIG. 3 being a view taken on line 3—3 of FIG. 2.

FIGS. 4 and 5, respectively, are a plan view of another filter embodying this invention and a sectional view taken along the lines 5—5 of the filter illustrated in FIG. 4.

FIG. 6 is a sectional elevation view of still another embodiment of a filter assembly according to the present invention, showing a single filter plate.

FIGS. 7 and 8 are respectively a plan view and elevational view of another embodiment of the filter of the present invention.

FIG. 9 is a plot illustrating the relationship between the grain size of the aggregate in rigid filters of this invention and the pressure required to start the flow of molten aluminum through the pores of the filter.

FIG. 10 is a plot illustrating the relationship of aggregate grain size in a filter and the inclusion content of aluminum filtered therethrough.

DETAILED DESCRIPTION OF THE INVENTION

In the embodiment shown in FIG. 1, a filter device according to this invention is included in an arrangement wherein heated liquid metal bearing solid impurities or inclusions passes downwardly through a conduit 25, thence through a feed leg 26 into filter chamber 28 of the filter assembly 30. Suitable connections are provided to enable disassembly for cleaning or other purpose. Assembly 30 comprises lower receptacle 29, suitably in this embodiment of cast iron, tubular in shape and closed at the base 31, and having an outwardly extending annular flange 32 at its upper edge, an inlet aperture 33 for hot impure liquid metal, and having an outlet aperture 34 and suitably capped drain pipe 35 for draining and cleaning receptacle 29 when desired or necessary, outlet aperture 34 being at a lower level than inlet aperture 33. Assembly 30 also includes tubular upper portion or manifold 37 which has an inwardly extending annular flange 38 at its lower edge which rests upon and is affixed and sealed to flange 32 by bolts (not shown) or in any desired manner. A top closure disk 39 is provided which fits over the top of manifold 37 insulating and protecting against splashing or accidental contamination of filtered metal in 37, and such closure element can be of a refractory or insulating material or of iron, or otherwise as suitable or desired. In one advantageous embodiment, as shown in FIG. 1a, closure element 39 is provided with perpendicularly or downwardly extending rods 41 which extend from the lower surface of element 39 to the upper surface of plate 45 and serve to hold the filter element assembly 40 in place when subjected to flow or surge of incoming liquid metal. In one embodiment there are three such rods 41 spaced at about 120° intervals but other spacing can be employed; or alternatively a metal ring 42 provided with holes or apertures 44, for outflow of metal, can be installed below closure on lid 39 and extending from lid 39 to plate 45 to hold down filter assembly 40. Manifold chamber 37 is provided with one or more outlet apertures 36 through which filtered metal flows outwardly along a suitable trough system (not shown) of a casting station (not shown).

Filter assembly 40 of FIG. 1 comprises plate 45, which is a fired, porous plate made according to this invention and consisting essentially of molten aluminum-resistant grains bonded by a prefused glass as described elsewhere herein, which is provided with apertures 46. Assembly 40 also comprises a plurality of rigid tubular filter elements 47, 47' of the same composition as plate 45, each closed at its lower end and communicating with an aperture 46 at its upper end, the inner surface of an element 47 being suitably continuous or in the same tubular plane with the inner surface of aperture 46 to facilitate smooth flow of metal. Filter element 47 is suitably affixed to plate 45 by mortar 48. Filter element 47 is a fired rigid shape made according to this invention. The mortar employed to affix the filter element to plate 45 is stable at the temperature of and resistant to attack by molten aluminum and is, for example, a phosphate-bonded high alumina mortar. If desired, one or more of tubular elements, e.g. 47', are each closed at its lower end by a coextensive closure plate 61 of the same composition as 47' which is mortared to tube 47' by mortar 18.

Filtration of molten aluminum normally is a batch process. A charge of aluminum is added to a furnace, melted, and heated to the proper temperature for casting, which normally involves some superheat above the melting point of the metal. When the molten metal is at the proper temperature—e.g., from 675° C. to 740° C.—the furnace is tapped and the metal is run through conduits or troughs, through a filter, and then into one or more casting molds—for example, continuous casting molds where the metal is solidified as an elongated ingot. It is undesirable to employ filters that occupy a large volume both from the standpoint of constructing suitable chambers for holding such a filter and from the standpoint of the difficulty and expense of manipulating large fragile filter elements. Accordingly, in plant operations filters are desired which have a high surface area per unit of volume to obtain the maximum capacity filter for the amount of space occupied by the filter assembly.

FIGS. 2 and 3 illustrate one such high-surface area filter embodying this invention. There is here shown a filter assembly generally designated 10 which comprises in this embodiment a permeable plate 11, permeable filter element 12 and permeable bottom plate 14, each being made of molten aluminum-resistant granules having an average major diameter between 0.25 and 2.5 millimeters and being ceramically bonded with a molten aluminum-resistant glass that constitutes from 4% to 20% of the weight of the filter element, or for best results from about 5% to about 14%. The assembly is advantageously made by employing a suitable mortar to fasten the plate 11 to the filter element 12 and it can be assembled by placing the plate 11 on an annular flange of a chamber provided with a molten aluminum feed means, and sealing the upper portion of plate 11 to a trough or other means for carrying filtered molten aluminum away from the chamber in a similar manner to that shown in FIG. 1. In operation molten aluminum passes into such a chamber, surrounds filter element 12 and passes through it into the central hollow portion and then upwardly from the hollow portion into the means for transferring molten aluminum from the filter to a mold. In order to increase the area available for filtration, the outer surface to filter element 12 is formed with undulate portions of cusps 13 giving filter element 12 a fluted appearance in plai view such as shown in FIG. 3. The filter element illustrated in FIG. 2 and FIG. 3 is typical of the characteristic of a family of such filter elements that have undulate outer surfaces and cylindrical inner surfaces in order to increase the available filter area and thereby the capacity of a filter that occupies a chamber of fixed diameter. The elements 13 can be thinner, more numerous or otherwise shaped so that the outer surface of filter element 12 is undulate and therefore substantially larger in area than a cylindrical surface of the same outside diameter.

FIGS. 4 and 5 illustrate another filter embodying this invention wherein substantially increased surface area per unit of filter volume is obtained. In the embodiment illustrated in FIGS. 4 and 5, there is shown a filter assembly generally designated 20 consisting of a plate 21 and a number of tubular filter elements 22. In this embodiment seven filter elements are embedded in or affixed to the plate 21 in a regular geometric pattern, and at their ends remote from plate 21 are closed by a common closure plate 27 of the same composition as the tubular elements, plate 27 being suitably mortared to the end of each tube 22. However, more or less than seven such elements can be employed in different patterns and with different spacings so that substantially increased filter surface area may be made available compared with the surface area of a single cylindrical filter element having an outside diameter that would encompass the periphery of the outer ring of filter element 22. In the embodiment of FIGS. 4 and 5 the assembly 20 can be installed in a chamber having a molten aluminum feed and can be fastened to an upper trough so that molten aluminum passes from the outside of each element 22 and plate 27 to the interior channel 24 and out through an aperture 23 in plate 21 into a transfer trough (not shown) for transporting the metal to one or more casting stations, similarly to the arrangement shown in FIG. 1. This is an especially strong and stable form of the invention.

FIG. 6 shows a further embodiment of a filter wherein a single filter plate 50 made according to this invention is placed in a chamber 53, supported by and sealed to ledge or shoulder 54 and also held down by ring 55 and top closure 56, ring 55 having apertures 57 to permit metal to flow therethrough.

In FIGS. 7 and 8 is shown another embodiment of a filter according to this invention wherein there are employed a number of plates of the composition defined herein. Plates 59 are joined together, e.g., by mortaring at longitudinal edges 51 thereof, to form a box, and a closure plate 52 of conforming configuration closes the bottom of the box and is mortared at 18 to the bottom edges of plates 59. The top is open and when inserted in a suitable filtering chamber, metal flows through plates 59 and 52 and is thereby filtered. Flow can be either inwardly or outwardly to accommodate the intake and the casting arrangements.

FIG. 9 illustrates the relationship between the average aggregate particle size and the pressure required to force molten aluminum alloys through the pores of filters made according to this invention. The pores decrease in size as the average aggregate particle size decreases. Therefore, higher pressures are required to overcome the surface tension of molten aluminum as the average particle size of aggregate in the rigid filter decreases. Pressures up to about 6 p.s.i. can be generated by the effects of gravity or the normal head of metal in the feed system but, generally, artificial means of creating pressure must be used in aluminum production plants for pressures exceeding about 6 p.s.i. Thus, in the usual gravity flow system an average aggregate particle size, as shown in FIG. 9, of at least about 0.25 mm. is desired.

To demonstrate the benefits of the present invention, there are reported below and shown in FIG. 10 the results of a series of tests in which molten aluminum was filtered, cast, forged and tested as indicated below. The aluminum in all cases was 7079 alloy having a composition expressed in weight percent falling within the ranges set forth below.

Si—0.30 max.
Fe—0.40 max.
Cu—0.40–0.8
Mn—0.10–0.30
Mg—2.9–3.7
Cr—0.10–0.25
Zn—3.8–4.8
Ti—0.10 max.
Other—0.15 max.
Aluminum—Remainder The alloy was prepared by melting aluminum of known composition and then adding sufficient alloying metals to make the desired composition. Chlorine gas was then bubbled through the molten mixture to strip it of dissolved gases after which the molten metal was passed through a filter except in those cases where the absence of a filter is indicated, and cast by the well-known direct chill casting process into 6 in. diameter ingots. A total of five ingots were cast for each grade of filter, a new filter for each ingot, and six ingots were made without a filter. These unfiltered metal ingots exhibited, when examined as shown below, an average number of inclusions of over 90. The filters employed were of the shape shown in FIG. 6. The resultant total of twenty-six ingots were evaluated in several ways. The grain size was evaluated by inspection. The ingots were cut into 14 in. long sections and a slice 1 in. long was removed from each ingot for chemical analysis. The ingots were scalped to a diameter of 5⅜ in. after which they were forged to solid shapes 2⅝ in. by 6½ in. x 17 in. in a hammer forge while at a temperature between 715° and 780° F. After forging all pieces were solution heat treated six hours at 835° F. and quenched in water. This was followed by pre-aging for five-hours at 120° F. and aging for 48 hours at 240° F.

Twenty-five tensile test specimens, nominal ½ inch diameter by 1.4-inch gage length, were prepared from each forging for tensile testing and they were then pulled to fracture. The fractures were examined under 20 power magnification and both the number and type of inclusions were noted.

FIG. 10 illustrates the relationship between the average number of inclusions found on the fracture faces of the tensile specimens from each forging and the average aggregate particle size of each grade of filter; and demonstrates that maximum removal of solid inclusions is effected at about 0.25 mm. or below and that removal of such inclusions levels off at about 2.5 mm., or a little above, average particle diameter. The unfiltered metal ingots exhibited when examined as shown below an average number of inclusions of over 90. It has thus been found that metal of excellent quality, substantially free of all harmful inclusions, is produced by filtering the metal through filters made according to this invention which have an average aggregate particle diameter of about 0.25 mm., below which little substantial improvement in metal quality is seen, and this size surprisingly is the same at which the metal starts to pass through the pores by gravity alone, as is shown in FIG. 9.

It is an advantage of the present invention that a ductile cast aluminum product is obtained when the molten metal is filtered through a rigid, fired shaped filter element made according to the present invention. When the molten metal is filtered through such element and cast by any desired method, especially however by a method which prevents subsequent contamination with solid inclusions, the cast metal will exhibit improved ductility over metal which is not filtered or which has been filtered through other types of filters. With particular respect to bed filters, it is a special advantage that a consistently high quality cast aluminum is obtained, and in a three-month series of runs employing filter media according to this invention followed by a casting step which protected the metal against recontamination by solids inclusions, the average recovery of fabricated products from such castings as determined by ultrasonic testing (described elsewhere herein) was 99.3% which was the highest, and consistently highest recovery of such products known to applicants.

It is a further advantage of the present invention that the filter elements can be made to specification at a central place and shipped to place of use, as desired. Particular advantages, however, lie in the extended life and freedom from channeling in these filters and in the uniformity of quality of castings enabled by their use.

The following example will illustrate a mode of carrying out the present invention.

EXAMPLE

A series of filter elements were prepared by screening crushed, fused alumina to recover particles with average sizes of 0.48 mm., 0.56 mm., 0.94 mm., and 1.06 mm. and with variations with respect to these average sizes as described hereinbefore. These particles were obtained by screening the alumina through a 32 mesh and on a 48 mesh, through a 28 mesh and on a 42 mesh, through a 16 mesh and on a 24 mesh, and through a 14 mesh and on a 20 mesh of the Tyler series screens, respectively. The recovered fused alumina fractions were mixed with 7.7% by weight of an organic bonding agent consisting essentially of dextrin, resin and aqueous wax emulsion and 8% by weight of a preformed vitreous material consisting of 25% calcium oxide, 35% aluminum oxide, and 40% boron oxide, all ground to pass a 300 mesh screen. This vitreous material was fused and formed as a glass before it was ground. The vitreous material was mixed in so that particles of the vitreous material uniformly coated the aluminum oxide aggregate particles, as determined by visual inspection.

An amount of the so-produced mixture was placed in a shallow, flat, circular mold and pressed with a hydraulic press to form a flat green shape having enough green strength to maintain its strength when handled gently. A number of such green shapes were made, placed in a furnace and fired to slightly above the fusion temperature of the vitreous glass. The glass flowed and fused the aggregate particles to each other leaving open spaces or pores between.

A series of filtration experiments was conducted with filters of various average particle sizes prepared as described above. In each experiment, a filter was installed in a chamber having a lower inlet for molten aluminum and an upper end adapted to receive a 6¼ inch diameter filter interposed between the chamber and the bottom of the trough connecting the filter chamber to a casting station. The aluminum, in all cases, was 7079 alloy having a composition expressed in weight percent falling within the ranges set forth above in obtaining the test results shown in FIG. 10. Melting, molten metal treatment, casting of ingots, scalping, forging, and thermal treatment of the forgings were as described above also with respect to the FIG. 10 tests.

From forgings which had been prepared from metal cast through the various filter grades, tensile test specimens of nominal ½ inch diameter with 1.4-inch gauge lenght were prepared from each forging. The elongation in the short transverse direction was determined for each specimen. A high short transverse elongation is a desirable property of strong aluminum alloy forgings as it is a direct indication of the ductility of the material. Forgings with a high inclusion content have poor ductility and cannot be used for critical forging applications such as aircraft parts.

FIG. 11 illustrates the relationship between the minimum short transverse elongation of tensile specimens from forgings produced from ingot cast through the various filter grades. Filter grade is an arbitrary commercial designation relating to the air permeability of a filter. Filter grade bears a relationship to the average aggregate particle size, as shown in FIG. 11. FIG. 11 clearly demonstrates that forgings prepared from metal filtered through successively finer filters improve in short transverse elongation. The decrease in elongation shown for the grade 40 filter, as compared with the grade 60 filter, is a result of grain coarsening of the metal, which was caused by removal of grain refining particles by the filter. This can be prevented by adding grain refiner to the molten alloy in the transfer trough between the filtering operation and the ingot casting operation.

Ultrasonic testing as mentioned herein is carried out with the aid of a Reflectoscope of Sperry Products, whereby a mounted quartz crystal is applied to the surface of filter, as compared with the grade 60 filter, is a result of the test piece, the crystal is caused to vibrate at ultrasonic frequencies of 0.5 million cycles or more per second and transmits a pulse beam of vibrations which travels through the piece and is reflected back from inclusions and from the other side. The reflected vibrations are detected by the crystal acting as a receiver and electrical impulses are sent to the screen of a cathode ray tube where they appear on a calibrated line as "pips."

The pore sizes of filters found to be advantageous for use in this invention have been found to average from about 0.036 inch (0.92 mm.) to about 0.0098 inch (0.25 mm.). They constitute, of course, mostly tortuous but continuously open passages from the inlet face to the outlet face of a filter. Flow of molten aluminum metal through a filter according to this invention occurs quite readily under a pressure of about 6 p.s.i., which is usually attained in plant practice under the normal head of metal by gravity flow, when the filter aggregate particles are of average maximum diameter of from 0.25 mm. to 2.5 mm. Where a term such as "average maximum diameter," "particle diameter" or "major diameter" is used herein with respect to particle size, it is intended to means that such particle passes through a Tyler screen of such size opening. It is of particular advantage to draw off the metal, after it passes through the filter, into a substantially level trough and thereby transport it to a casting station in quiet or tranquil flow. The plate to which a plurality of tubular filter elements is attached is advantageously of the composition of the present invention but can alternatively be an impervious plate.

Parts and percentages expressed herein are by weight unless otherwise indicated. It is to be understood that the filter assembly in practical use is suitably surrounded by a heated atmosphere, such as a jacket enclosing gas burners or otherwise, to maintain the metal in liquid state during filtering. Aluminum metal or alloys other than those shown above can be similarly filtered and products made therefrom likewise exhibit improved properties. Although the holddown ring or other holddown means in the chamber receiving the filtered aluminum has been described as made of metal, it will be understood that other suitable materials, e.g., molten aluminum-resistant refractory, can be used therefor. Also, in the assembly of a top plate and a plurality of tubes, the diameter of the plate apertures can, if desired, differ from the inside diameter of the tubes. In one embodiment, they are smaller than the inside diameter of the attached tubular filters. The mesh or screen sizes shown herein are Tyler mesh as described on pages 21–51 of Chemical Engineer's Handbook, fourth edition, John Perry editor-in-chief, published 1963, by McGraw-Hill Book Company.

The above specific description and drawings are given for purposes of illustration only, and it will be understood that modifications and variations can be made therein without departing from the spirit and scope of the appended claims.

Having now described the invention:

What is claimed is:

1. A rigid filter for removing entrained solids from molten aluminum consisting essentially of a shaped, fired admixture of (a) refractory particles resistant to molten aluminum and having an average maximum diameter of from about 0.165 mm. to about 2.8 mm. and (b) from 4% to 20% by weight, based on total fired weight of the admixture, of a preformed vitreous product consisting essentially of, by weight, from 15% to 80% boron oxide, from 5% to 50% calcium oxide and from 2% to 60% aluminum oxide and not more than 10% silica.

2. Filter as in claim 1 wherein said average diameter is from 0.25 mm. to 2.5 mm.

3. Filter as in claim 1 wherein said refractory particles are fused alumina.

4. Filter as in claim 1 wherein said refractory particles are tabular alumina.

5. Filter as in claim 1 having an undulate exterior surface.

6. Filter as in claim 1 exhibiting in said fired shape open tortuous passages of average diameter from 0.25 mm. to 0.92 mm.

7. A filter assembly comprising in combination a plate having a plurality of rigid hollow filter elements of the composition of claim 1, each of said hollow filter elements being affixed to a surface of said plate surrounding a corresponding aperture and debouching thereinto, each said element having a closed end remote from said aperture.

8. An assembly as in claim 7 wherein each of said filter elements is a tubular element and is disposed in registration with one of said apertures.

9. Filter as in claim 1 wherein said fired shape is a tube having one closed end.

10. An assembly for filtering molten aluminum metal comprising in combination a receptacle for molten aluminum, said receptacle having an inlet conduit and an upper portion and a lower portion, an annular flange disposed between said upper portion and said lower portion, said upper portion having an outlet for filtered metal, a plate disposed within said receptacle and supported by said annular flange, said plate having a plurality of apertures therethrough, a plurality of rigid tubular filter elements as in claim 9, each of said filter elements having an upper end and a lower end, said upper end being disposed in registration with one of said apertures and sealed to said plate, each said element being closed at said lower end, a cover means for said upper portion, and a holddown means for said plate extending between said cover and said plate.

11. Assembly as in claim 10 wherein said filter elements are closed by a common closure plate.

12. A filter for removing entrained solids from molten aluminum consisting essentially of a shaped, fired mixture of an admixture of
   (a) refractory particles resistant to molten aluminum, said particles having an average maximum diameter of from about 0.165 mm. to about 2.8 mm., and
   (b) a prefused vitreous bonding material containing not more than 10% silica, said bonding material being uniformly dispersed throughout the filter surrounding said particles and adhering them together to provide a rigid porous composition having intercommunicating pores.

13. Filter as in claim 12 wherein said prefused bonding material is from 4 to 20% by weight of the mixture, based on total fired weight of the admixture.

14. Filter as in claim 12 wherein said average maximum diameter of the refractory particles is from 0.25 mm. to 2.5 mm.

15. Filter as in claim 12 exhibiting in said fired shape open tortuous passages of average diameter from 0.25 mm. to 0.92 mm.

16. Filter as in claim 12 wherein said refractory particles are fused alumina.

17. Filter as in claim 12 wherein said refractory particles are tabular alumina.

18. A system for preparing ductile aluminum which comprises:
   (a) means for passing molten aluminum through a rigid filter consisting essentially of refractory particles resistant to molten aluminum, the average maximum diameter of said particles being from about 0.165 mm. to 2.8 mm., and a prefused bonding material containing not more than 10% silica, said bonding material being uniformly dispersed throughout the filter surrounding said particles and adhering them together to provide a rigid porous composition having interconnecting pores, and
   (b) means for passing said molten aluminum from said filter into a substantially level trough for subsequent transport to a casting mold.

19. A system for preparing ductile aluminum which comprises:
   (a) means for passing molten aluminum through a rigid filter consisting essentially of refractory particles resistant to molten aluminum, the average maximum diameter of said particles being from about 0.165 mm. to 2.8 mm., and as bond uniformly dispersed through said filter and surrounding said particles from about 4% to about 20% by weight of a preformed vitreous product consisting essentially of from 15% to 80% boron oxide, 5% to 50% calcium oxide, 2% to 60% aluminum oxide and not more than 10% silica, and
   (b) means for passing said molten aluminum from said filter into a substantially level trough for subsequent transport to a casting mold.

References Cited

UNITED STATES PATENTS

| | | | |
|---|---|---|---|
| 1,081,573 | 12/1913 | Boeck | 210—510 |
| 1,117,601 | 11/1914 | Porter. | |
| 2,021,520 | 11/1935 | Reichmann | 210—510 X |
| 2,635,991 | 4/1953 | Briggs. | |
| 2,804,168 | 8/1957 | Church. | |
| 2,997,402 | 8/1961 | McDonald et al. | |
| 3,235,089 | 2/1966 | Burroughs | 210—506 X |

REUBEN FRIEDMAN, Primary Examiner

F. A. SPEAR, Jr., Assistant Examiner

U.S. Cl. X.R.

210—323, 496, 504, 506, 510

UNITED STATES PATENT OFFICE
CERTIFICATE OF CORRECTION

Patent No. 3,524,548　　　　　　　　Dated August 18, 1970

Inventor(s) Howard A. McDonald and Robert C. Snyder

It is certified that error appears in the above-identified patent and that said Letters Patent are hereby corrected as shown below:

Col. 2, lines 12-13, "is refractory" should be -- is employed in the refractory --; Col. 2, line 14, "size from" should be -- size of from --; Col. 2, line 48, "magneuim" should be -- magnesium --; Col. 4, line 67, "plai" should be -- plan --; Col. 4, line 68, "the" should be -- and --; Col. 4, line 73, "elements" should be -- element --; Col. 6, line 29, "five-hours" should be -- five hours --; Col. 7, line 54, "lenght" should be -- length --; Col. 8, line 7, "surface of filter, as compared with the grade 60 filter, is a result of the test" should be -- surface of the test --; and Col. 8, line 29, "means" should be -- mean --.

Signed and sealed this 30th day of March 1971.

(SEAL)
Attest:

EDWARD M. FLETCHER, JR.
Attesting Officer

WILLIAM E. SCHUYLER, JR.
Commissioner of Patents